United States Patent
Motta et al.

(10) Patent No.: US 9,719,874 B2
(45) Date of Patent: Aug. 1, 2017

(54) PRESSURE SENSOR DEVICE FOR MEASURING A DIFFERENTIAL NORMAL PRESSURE TO THE DEVICE AND RELATED METHODS

(71) Applicant: STMICROELECTRONICS S.R.L., Agrate Brianza (IT)

(72) Inventors: Alessandro Motta, Cassano d'Adda (IT); Alberto Pagani, Nova Milanese (IT); Giovanni Sicurella, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 67 days.

(21) Appl. No.: 14/754,788

(22) Filed: Jun. 30, 2015

(65) Prior Publication Data

US 2017/0003186 A1    Jan. 5, 2017

(51) Int. Cl.
  *G01L 9/06* (2006.01)
  *G01L 1/18* (2006.01)
  *G01L 9/00* (2006.01)

(52) U.S. Cl.
  CPC ............ *G01L 9/0052* (2013.01); *G01L 9/065* (2013.01)

(58) Field of Classification Search
  CPC ............ G01L 1/18; G01L 9/06; G01L 9/0052
  See application file for complete search history.

(56) References Cited

U.S. PATENT DOCUMENTS

| | | | |
|---|---|---|---|
| 4,236,832 A | 12/1980 | Komatsu et al. | |
| 5,094,973 A | 3/1992 | Pang | |
| 6,950,767 B2 | 9/2005 | Yamashita et al. | |
| 7,856,885 B1* | 12/2010 | Bhansali | G01D 11/245 73/715 |
| 8,378,834 B1 | 2/2013 | Glaub et al. | |
| 2005/0162160 A1 | 7/2005 | Ausserlechner et al. | |
| 2015/0311353 A1* | 10/2015 | Van Der Wiel | G01L 9/0055 73/862.629 |
| 2016/0103035 A1 | 4/2016 | Pagani | |
| 2016/0172311 A1 | 6/2016 | Pagani et al. | |
| 2016/0223444 A1 | 8/2016 | Pagani et al. | |

OTHER PUBLICATIONS

Jaeger et al., "CMOS Stress Sensors on (100) Silicon," IEEE Journal of Solid-State Circuits, vol. 35, No. 1, Jan. 2000, pp. 85-95.

(Continued)

*Primary Examiner* — Nguyen Ha
(74) *Attorney, Agent, or Firm* — Slater Matsil, LLP

(57) ABSTRACT

A pressure sensor device is to be positioned within a material where a mechanical parameter is measured. The pressure sensor device may include an IC having a ring oscillator with an inverter stage having first doped and second doped piezoresistor couples. Each piezoresistor couple may include two piezoresistors arranged orthogonal to one another with a same resistance value. Each piezoresistor couple may have first and second resistance values responsive to pressure. The IC may include an output interface coupled to the ring oscillator and configured to generate a pressure output signal based upon the first and second resistance values and indicative of pressure normal to the IC.

29 Claims, 10 Drawing Sheets

(56) References Cited

OTHER PUBLICATIONS

Suhling et al., "Silicon Piezoresistive Stress Sensors and Their Application in Electronic Packaging," IEEE Sensors Journal, vol. 1, No. 1, Jun. 2001, pp. 14-30.
Kuo et al., "Smart-Cut Piezoresistive Strain Sensors for High Temperature Applications," IEEE Sensors 2009 Conference, pp. 1290-1292.
Barlian et al., "Review: Semiconductor Piezoresistance for Microsystems," Proceedings of the IEEE, vol. 97, No. 3, Mar. 2009, pp. 513-552.
Maldovan, "Review—Sound and Heat Revolutions in Phononics," Nature, vol. 503, Nov. 14, 2013, pp. 209-217.
A. Pagani et al., U.S. Appl. No. 14/754,799, filed Jun. 30, 2015.

* cited by examiner

PRESSURE SENSOR DEVICE FOR MEASURING A DIFFERENTIAL NORMAL PRESSURE TO THE DEVICE AND RELATED METHODS

TECHNICAL FIELD

The present disclosure relates to the field of electronic devices, and, more particularly, to integrated circuits and related methods.

BACKGROUND

In solid structures, particularly in load-bearing structures of, for example, bridges, buildings, tunnels, railways, containment walls, dams, embankments, pipelines and underground structures of metropolitan transport lines, and so on, it is important to monitor, in many points, significant parameters, like, for example, pressure, temperature and mechanical stresses. Such monitoring is carried out periodically or continuously, and is useful both at the initial stage and during the lifetime of the structure.

For this purpose, an approach in this field includes the application of electronic monitoring devices based on electronic sensors, capable of providing good performance at low cost. Usually, such devices are applied onto the surface of the structures to be monitored, or inside recesses already in the structure and accessible from the outside.

Such devices are not able to exhaustively detect the parameters within the structure to be monitored, which it may be useful to know to evaluate the quality of the structure, its safety, its ageing, its reaction to variable atmospheric conditions, and so on. Moreover, such devices can only typically be applied after the structure has been built, and not while it is being built. Therefore, they may be unable to evaluate possible initial or internal defects.

An approach to these requirements is disclosed in U.S. Pat. No. 6,950,767 to Yamashita et al., which provides an electronic monitoring device entirely contained, i.e. "buried", within the material (for example, reinforced concrete) from which the structure to be monitored is made. More specifically, the device buried in the structure is an entire system encapsulated in a single package, made up of different parts, assembled on a substrate, such as integrated circuits, sensors, antenna, capacitors, batteries, memories, control units, and yet more, made in different chips connected together through electrical connections made with metallic connections.

The system of U.S. Pat. No. 6,950,767 to Yamashita et al. also comprises sub-systems having functions correlated with the power supply, for example, rectifiers in the case in which it receives energy from the outside, through electromagnetic waves, or else its own battery for generating the power supply internally. It may be observed that a monitoring system intended to be "embedded" initially in a building material (for example, liquid concrete, which will then solidify) and to then remain "buried" in the solid structure, is subjected to critical conditions, for example, extremely high pressures, which can even be a few hundreds of atmospheres. There are also numerous other causes of wearing, over time, due, for example, to water infiltration, capable of damaging the system.

A potential drawback to systems, such as that disclosed in U.S. Pat. No. 6,950,767 to Yamashita et al., derives from the fact that they are complex systems, even though they are enclosed in a package, and can therefore be damaged when facing the operating conditions in which they work. In particular, the electrical interconnections between the various parts of the package can be vulnerable. Generally, electrical interconnections inside a harsh environment, such as a concrete structure, are not reliable and have a short lifetime, for example, due to mechanical stress and corrosion.

Moreover, a "window" is provided in the package to allow the sensor to detect an associated parameter can be a weak point for possible infiltration of humidity. Furthermore, a crack or imperfection in the coating material can allow water and chemical substances to penetrate inside the package and cause short-circuits. In addition to water, other substances, such as potentially corrosive acids, can also infiltrate. In general, although designed for the mentioned use, the reliability of systems like that of U.S. Pat. No. 6,950,767 to Yamashita et al. has a limitation due to the complexity of the structure of such systems, although miniaturized. A possible approach is to create an electronic system fully embedded in an integrated circuit without electrical interconnections, but it may need an efficient way to supply power to IC by electromagnetic waves, reducing power loss due to semiconductor material conductivity.

SUMMARY

Generally speaking, a pressure sensor device is to be positioned within a material where a mechanical parameter is measured. The pressure sensor device may include an integrated circuit (IC) having a ring oscillator with an inverter stage having first doped and second doped piezoresistor couples. Each piezoresistor couple may include two piezoresistors arranged orthogonal to one another with a same resistance value. Each piezoresistor couple may have first and second resistance values responsive to pressure. The IC may include an output interface coupled to the ring oscillator and configured to generate a pressure output signal based upon the first and second resistance values and indicative of pressure normal to the IC.

A pressure sensor device is to be positioned within material. The pressure sensor device may include an IC comprising a ring oscillator comprising a plurality of inverter stages coupled together. At least one of the plurality of inverter stages may include first and second piezoresistors coupled together, arranged orthogonal to one another, and having first and second resistance values responsive to pressure. The IC may include an output interface coupled to the ring oscillator and configured to generate a pressure output signal based upon the first and second resistances and indicative of pressure normal to the IC.

In some embodiments, the at least one inverter stage may comprise first and second inverter stages. The first inverter stage may have first and second piezoresistors comprising a semiconductor material having a first conductivity type. The second inverter stage may have first and second piezoresistors comprising a semiconductor material having a second conductivity type.

In another embodiment, the first and second piezoresistors comprise a semiconductor material having a first conductivity type, and the at least one inverter stage may also comprise third and fourth piezoresistors coupled together and comprising a semiconductor material having a second conductivity type. Also, the third and fourth piezoresistors may be arranged orthogonal to one another, and have third and fourth resistance values responsive to pressure.

Additionally, the output interface may comprise a wireless transmitter. The output interface may comprise a modulator coupled upstream of the wireless transmitter and configured generate the pressure output signal by modulating an output of the ring oscillator circuit. The modulator may be configured to operate based upon an amplitude-shift keying modulation. The at least one inverter stage may comprise a capacitor coupled to the first and second piezoresistors.

Another aspect is directed to a pressure sensor device to be positioned within material. The pressure sensor device may include an IC comprising a ring oscillator comprising a plurality of inverter stages coupled together. At least one of the plurality of inverter stages may include a first piezoresistor, and at least one other inverter stage of the plurality of inverter stages may include a second piezoresistor arranged orthogonal to the first piezoresistor. The first and second piezoresistors may have first and second resistance values responsive to pressure. The IC may include an output interface coupled to the ring oscillator and configured to generate a pressure output signal based upon the first and second resistances and indicative of pressure normal to the IC.

Yet another aspect is directed to a method of making a pressure sensor device to be positioned within material. The method may comprise forming an IC comprising a ring oscillator comprising a plurality of inverter stages coupled together. At least one of the plurality of inverter stages may comprise first and second piezoresistors coupled together, arranged orthogonal to one another, and having first and second resistance values responsive to pressure. The IC may include an output interface coupled to the ring oscillator and configured to generate a pressure output signal based upon the first and second resistances and indicative of pressure normal to the IC.

Another aspect is directed to a method of making a pressure sensor device to be positioned within material. The method may include forming an IC comprising a ring oscillator comprising a plurality of inverter stages coupled together. At least one of the plurality of inverter stages may include a first piezoresistor, and at least one other inverter stage of the plurality of inverter stages may include a second piezoresistor arranged orthogonal to the first piezoresistor. The first and second piezoresistors may have first and second resistance values responsive to pressure. The IC may include an output interface coupled to the ring oscillator and configured to generate a pressure output signal based upon the first and second resistances and indicative of pressure normal to the IC.

DETAILED DESCRIPTION

Figure 1A:
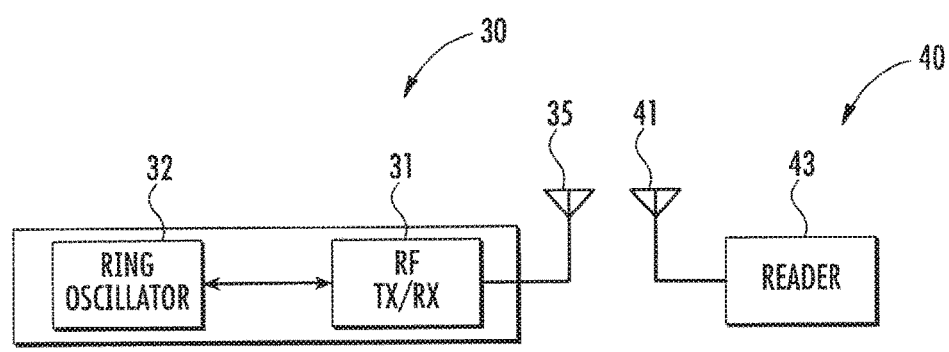
FIGS. 1A-1B are schematic diagrams of embodiments of a pressure sensor device and reader device, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-4B, a differential pressure sensor device 30 according to the present disclosure is not described. The differential pressure sensor device 30 is to be positioned within a material (e.g. gas, liquid, or solid). An example of material can be the building material (e.g. concrete). Depending on application, the differential pressure sensor 30 can measure the pressure variation in difference of time (at two different times) or in difference of location (in two different positions in the space). If the measurement is a pressure variation in time (FIG. 2A), then the differential pressure sensor device 30 illustratively includes a substrate 45, and an IC 44 carried by the substrate 45. If the pressure measurement is varied in location (FIG. 2B), then the differential pressure sensor device 30 illustratively includes two ICs 44, 44', possibly carried by the substrate 45 positioned at a fixed/known distance. Otherwise, in an embodiment now shown, if the space where occurs pressure variation is of the order of millimeters or micrometers, it is possible to use only one IC 44 with two sensors positioned in different areas of IC 44.

Figure 15:
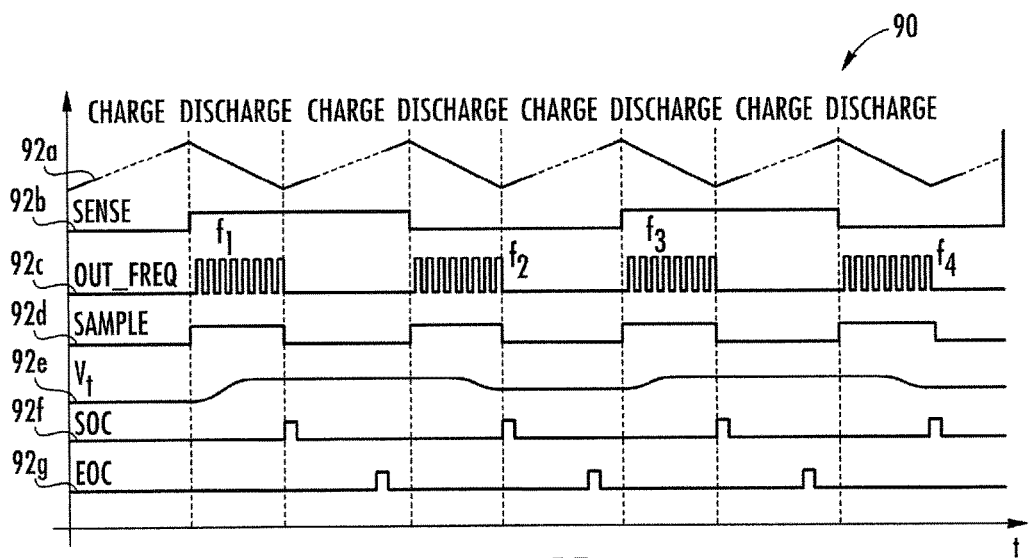
FIG. 15 is a diagram illustrating operation of the reader device of FIG. 15.

The IC 44 illustratively includes at least one ring oscillator 32 comprising a plurality of inverter stages 46a-46c coupled together, and an antenna 35 coupled to the output interface 31 (wireless output interface in FIG. 1A, and shown as a wired output interface 631 in FIG. 15). The number of inverter stages 46a-46c is illustratively shown in FIG. 3 as three, but any odd number configuration can be used. Hereafter, it is described several embodiments of a pressure sensor, in particular it is described the inverter stage that defines the ring oscillators.

Figures 4A, 4B:
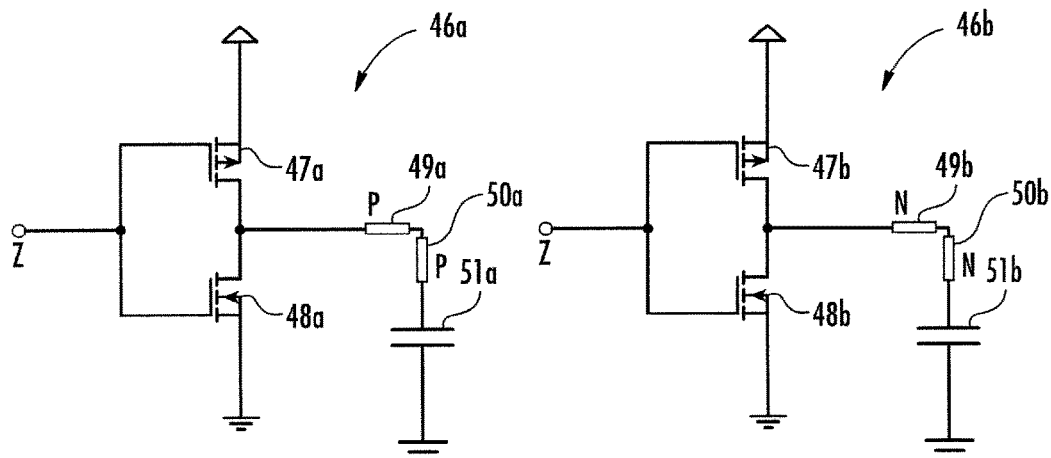
FIGS. 4A-4B are schematic diagrams of inverter stages in the pressure sensor device of FIGS. 1A-1B.

In FIGS. 4A-4B, a first embodiment of the pressure sensor includes two independent ring oscillator stages, because these two stages are part of two independent ring oscillators. The first ring oscillator has at least one inverter stage that comprises an inverter stage 46a. The inverter stage 46a illustratively includes first and second piezoresistors 49a, 50a, arranged orthogonal (L-orientation) to one another (i.e. positioned rotationally at about 90 degrees, e.g., a range of 80-100 degrees) comprising a semiconductor material having a first conductivity type (e.g. N-type or P-type doped semiconductor). The second ring oscillator has at least one inverter stage 46b that includes first and second piezoresistors 49b, 50b, arranged orthogonal (L-orientation) to one another (i.e. positioned rotationally at about 90 degrees, e.g., a range of 80-100 degrees), comprising a semiconductor material having a second conductivity type different from the first conductivity type (e.g. N-type or P-type doped semiconductor). The output signal of each ring oscillator is affected by the resistance variation due to external pressure variation. Each of the first and second inverter stages 46a-46b comprises first and second transistors 47a-48b coupled in series and between first (e.g. supply voltage) and second (e.g. ground) reference voltages, and a capacitor 51a-51b coupled between the second piezoresistors 50a-50b and the second reference voltage.

Figure 1B:
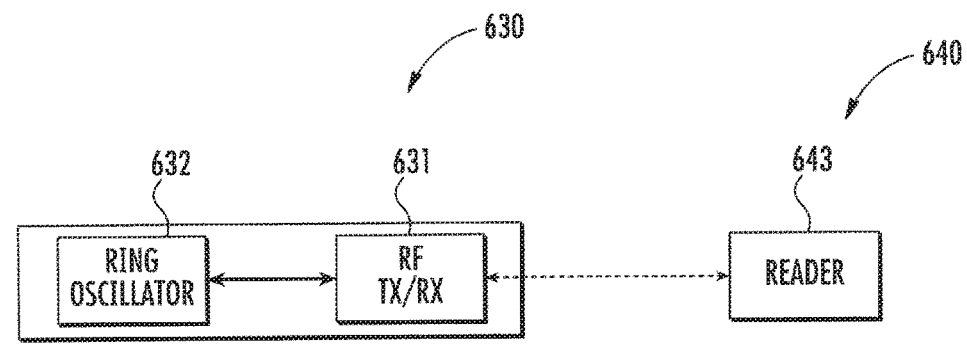
Figure 2A:
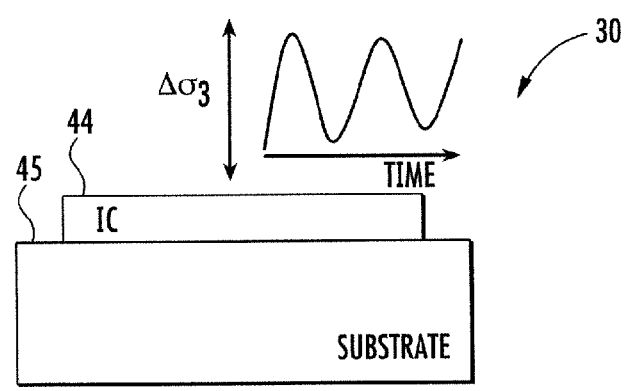
FIGS. 2A-2B are schematic diagrams of a pressure sensor device, according to the present disclosure.
Figure 2B:
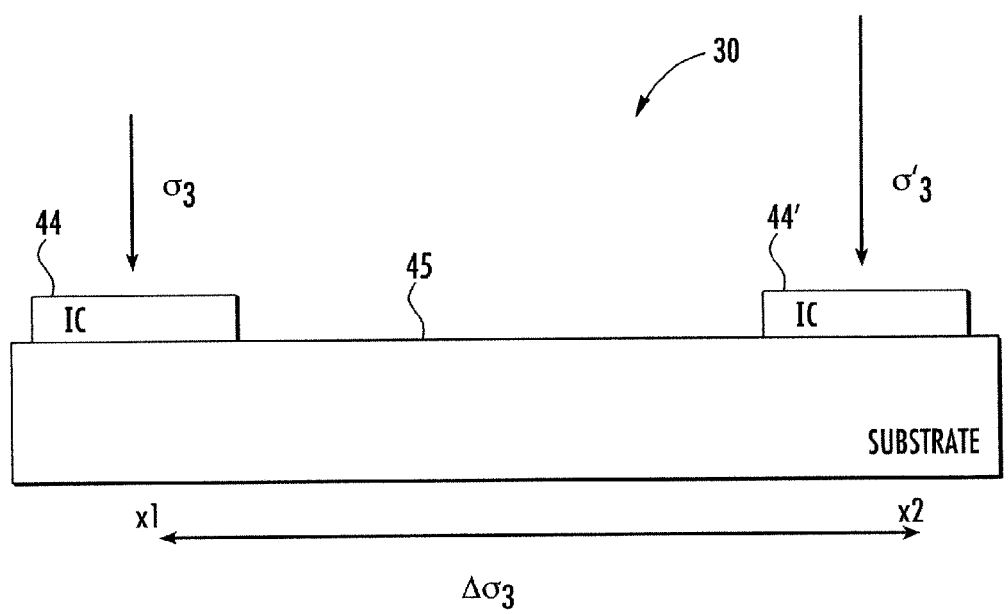
Figure 3:
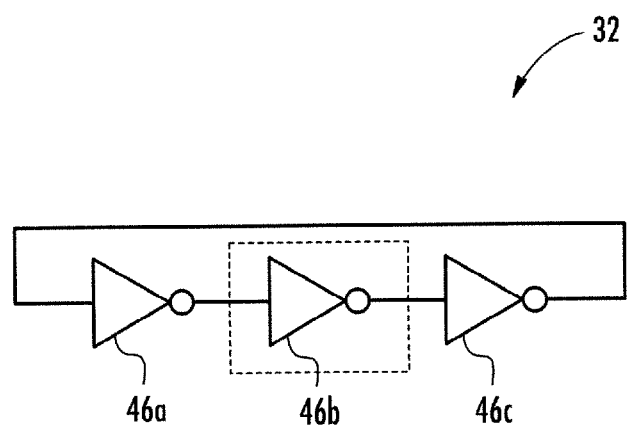
FIG. 3 is a schematic diagram of a ring oscillator in the pressure sensor device of FIGS. 1A-1B.

The IC 44 illustratively includes the output interface 31 coupled to the ring oscillators 32 and configured to generate a pressure output signal based upon the first and/or the second resistances and indicative of pressure normal to the IC 44. Additionally, as shown in FIG. 1A or 1B, the output interface 31 is configured to generate the pressure output signal by modulating an output of the at least one ring oscillator circuit 32. The modulator inside output interface 31 may be configured to operate based upon an amplitude-shift keying (ASK) modulation or a different known modulation scheme.

Since the differential pressure sensor device 30 could be embedded inside a material, like a building material, the pressure sensor device may be read wirelessly, as in FIG. 1A, by an external system such as the reader device 40, and then the differential pressure sensor device 30, and in particular the output interface 31 is coupled to an antenna 35. The reader device 40 also comprises an antenna 41, and a reader module 43 coupled to the antenna. As will be appreciated, the antenna 35 may be embedded in the differential pressure sensor device 30. Otherwise, as shown in FIG. 1B, the pressure sensor device may be read with an RF cable or using a power line communication.

From the output of the two ring oscillators, the pressure normal to the IC is determined by removing the x-y axis pressure components as follows. Considering the embodiment of FIGS. 4A-4B, a diffused P-type resistor Rp (49a, 50a) and a diffused N-type resistor Rn (49b, 50b) have an L-orientation. Their resistance variation is linked to a ring oscillator's parameter by:

$$\frac{dR_p}{R_p} = \frac{d\tau_p}{\tau_p} \qquad \frac{dR_n}{R_n} = \frac{d\tau_n}{\tau_n}$$

where τp and τn are the oscillating time of the two ring oscillators. So, measuring the oscillating time, it is possible to measure resistance variation. An external pressure is applied to the two resistors Rp and Rn, and here the pressure varies in time. At a temperature T (measured in case with an integrated thermal sensor) and at two different times, named t1 and t2, with t2>t1, the resistance variation of the previous two resistors can be measured.

$$\left.\frac{\Delta R_n}{R_n}\right|_{t_1} \quad \left.\frac{\Delta R_p}{R_p}\right|_{t_1}$$

$$\left.\frac{\Delta R_n}{R_n}\right|_{t_2} \quad \left.\frac{\Delta R_p}{R_p}\right|_{t_2}$$

$$t_1 \to \sigma_1(t_1), \sigma_2(t_1), \sigma_3(t_1), T$$

$$t_2 \to \sigma_1(t_2), \sigma_2(t_2), \sigma_3(t_2), T$$

$$\sigma_1(t_1) \neq \sigma_1(t_2)$$

$$\sigma_2(t_1) \neq \sigma_2(t_2)$$

$$\sigma_3(t_1) \neq \sigma_3(t_2)$$

where σ1(t1) is the x-component stress at time t1, σ2(t1) is the y-component stress at time t1, σ3(t1) is the z-component stress (the normal component) at time t1, σ1(t2) is the x-component stress at time t2, σ2(t2) is the y-component stress at time t2 and σ3(t2) is the z-component stress (the normal component) at time t2, and σ1(t1) is different from σ1(t2), σ2(t1) is different from σ2(t2) and σ3(t1) is different from σ3(t2).

Supposing, that there is a very different dynamic process time, i.e. measurement time (MHz-GHz)<<stress variation time (kHz)<<thermal variation time (Hz) (e.g., building structures have a huge mass; therefore, temperature variation is low as time passes), then, from the previous four measurements, the following relation can be derived and provides the normal pressure variation $$\Delta\sigma_3(\Delta t)|_T = \sigma_3(t_2) - \sigma_3(t_1) = \frac{1}{\pi_{12}^n - a\pi_{12}^p}\left[\left.\frac{\Delta R_n}{R_n}\right|_{t_2} - \left.\frac{\Delta R_n}{R_n}\right|_{t_1} - a\left(\left.\frac{\Delta R_p}{R_p}\right|_{t_2} - \left.\frac{\Delta R_p}{R_p}\right|_{t_1}\right)\right]$$

where $$@t_1 \begin{cases} \left.\frac{\Delta R_n}{R_n}\right|_{t_1} = \frac{\pi_l^n + \pi_t^n}{2}(\sigma_1(t_1) + \sigma_2(t_1)) + \pi_{12}^n\sigma_3(t_1) + \alpha_1^n\Delta T + \alpha_2^n\Delta T^2 \\ \left.\frac{\Delta R_p}{R_p}\right|_{t_1} = \frac{\pi_l^p + \pi_t^p}{2}(\sigma_1(t_1) + \sigma_2(t_1)) + \pi_{12}^p\sigma_3(t_1) + \alpha_1^p\Delta T + \alpha_2^p\Delta T^2 \end{cases}$$

$$@t_2 \begin{cases} \left.\frac{\Delta R_n}{R_n}\right|_{t_2} = \frac{\pi_l^n + \pi_t^n}{2}(\sigma_1(t_2) + \sigma_2(t_2)) + \pi_{12}^n\sigma_3(t_2) + \alpha_1^n\Delta T + \alpha_2^n\Delta T^2 \\ \left.\frac{\Delta R_p}{R_p}\right|_{t_2} = \frac{\pi_l^p + \pi_t^p}{2}(\sigma_1(t_2) + \sigma_2(t_2)) + \pi_{12}^p\sigma_3(t_2) + \alpha_1^p\Delta T + \alpha_2^p\Delta T^2 \end{cases}$$

The operation a(*) cancels out the x-y planar pressure contribution while the subtraction terms $$\left.\frac{\Delta R_n}{R_n}\right|_{t_2} - \left.\frac{\Delta R_n}{R_n}\right|_{t_1}, \quad \left.\frac{\Delta R_p}{R_p}\right|_{t_2} - \left.\frac{\Delta R_p}{R_p}\right|_{t_1}$$

remove the explicit thermal variation terms. The value of a can be obtained from a calibration procedure of the system, applying a known normal pressure $\Delta\sigma_3$. From the piezoresistance theory, this parameter is equal to:

$$a(T) = \frac{\pi_l^n(T) + \pi_t^n(T)}{\pi_l^p(T) + \pi_t^p(T)}.$$

In general, this parameter depends on temperature.

For example, if the applied pressure is $$\sigma_3 = \sigma_0 \sin(\omega_0 t);$$

then (the right side is measured as previous described), see $$\left.\frac{\Delta\sigma_3(\Delta t)}{\Delta t}\right|_T = \omega_0 \sigma_0 \cos(\omega_0 t).$$

From these measurements, it can be obtained that:

$$\omega_0 = \omega_{measured}$$

$$\sigma_0 = \frac{A_{measured}}{\omega_{measured}}.$$

If there are more oscillating modes, Fourier analysis can be used. All the other embodiments, that will be describe, are built to use the same previous procedure to extract the normal pressure. The same concept can be applied if the measurement is a pressure variation in space. Substituting t1 with x1 and t2 with x2, it is possible to extract the normal pressure variation in space. It is necessary that the temperature at position x1 and position x2 is the same.

The normal pressure variation can be computed inside the differential pressure sensor device 30, for example by an embedded microcontroller, or microprocessor or Digital Signal Processor (DSP) or outside differential pressure sensor device 30 by the reader 40.

Yet another aspect is directed to a method of making a differential pressure sensor device 30 to be positioned within building material. The method may comprise forming an IC 44 comprising at least one ring oscillator 32 comprising a plurality of inverter stages 46a-46c coupled together. In a first ring oscillator, at least one of the plurality of inverter stages 46a-46c may comprise first piezoresistors 49a-50a arranged orthogonal to one another, and having first resistance values responsive to pressure. In a second ring oscillator, at least one of the plurality of inverter stages 46a-46c may comprise first piezoresistors 49b-50b arranged orthogonal to one another, and having second resistance values responsive to pressure. The IC 44 may include an output interface 31 coupled to the at least one ring oscillator 32 and configured to generate a pressure output signal based upon the first and second resistances and indicative of pressure normal to the IC.

Figure 5:
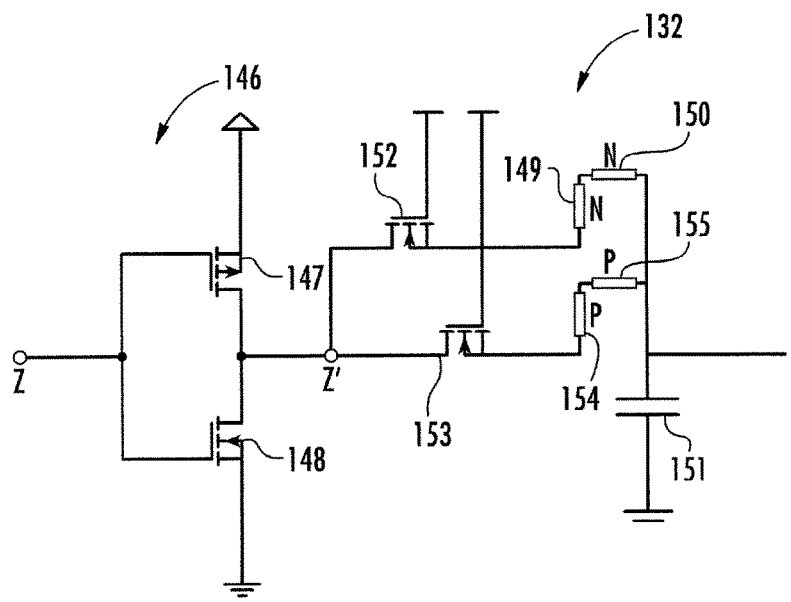
FIG. 5 is a schematic diagram of another embodiment of an inverter stage, according to the present disclosure.

Referring now additionally to FIG. 5, a second embodiment of a pressure sensor includes a single ring oscillator 132. In this embodiment of the ring oscillator 132, those elements already discussed above with respect to FIGS. 1-4 are incremented by 100 and most require no further discussion herein. This embodiment differs from the previous embodiment in that there is only one ring oscillator 132 that includes the inverter stage 146. Here, the inverter stage 146 illustratively includes third and fourth piezoresistors 154-155 coupled together. Also, the first and second piezoresistors 149-150 comprise a semiconductor material having a first conductivity type, and the third and fourth piezoresistors 154-155 comprise a semiconductor material having a second conductivity type different from the first. Also, the third and fourth piezoresistors 154-155 are arranged orthogonal to one another (in a L-orientation), and have third and fourth resistance values responsive to pressure.

Moreover, the inverter stage 146 illustratively includes third and fourth transistors 152-153 coupled in parallel to the first and second transistors 147-148. The first and second piezoresistors 149-150 are coupled to the third transistor 152, and the third and fourth piezoresistors 154-155 are coupled to the fourth transistor 153. In this embodiment, there may be less of a drop in the supply voltage and process variation, thereby providing for a more accurate measurement of pressure. Moreover, the piezoresistors 149-150 and 154-155 are part of the same circuit and then are really closed one to another, therefore they are superimposed to the same pressure/stress.

Figures 6A, 6B:
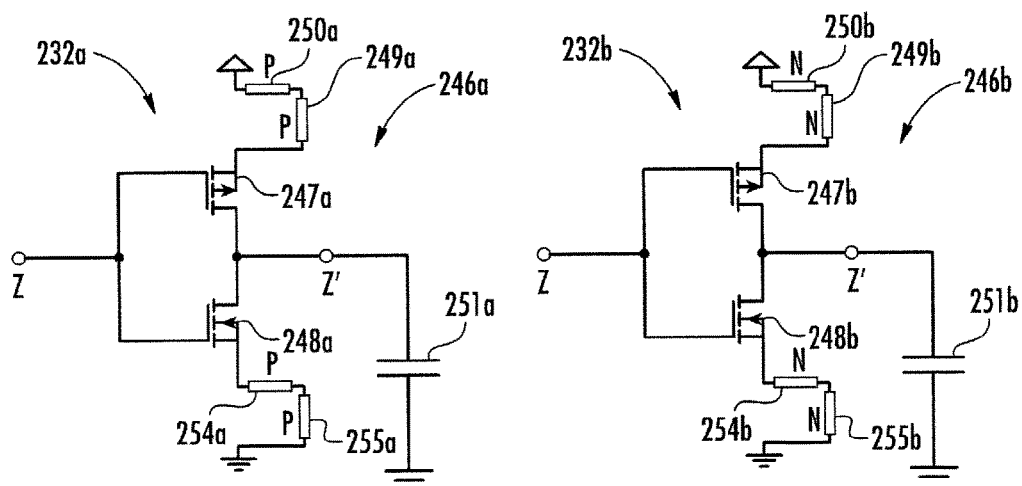
FIGS. 6A-6B are schematic diagrams of another embodiment of first and second inverter stages, respectively, according to the present disclosure.

Referring now additionally to FIGS. 6A-6B, a third embodiment of a pressure sensor includes two independent ring oscillator 232a-232b. In this embodiment of the ring oscillators 232a-232b, those elements already discussed above with respect to FIGS. 1-4 are incremented by 200 and most require no further discussion herein. This embodiment differs from the previous embodiment in that each ring oscillator 232a-232b further comprises third and fourth piezoresistors 254a-255b coupled to the second transistor 248a-248b. The first and second piezoresistors 249a-250b are coupled to the first transistor 247a-247b.

Figure 7:
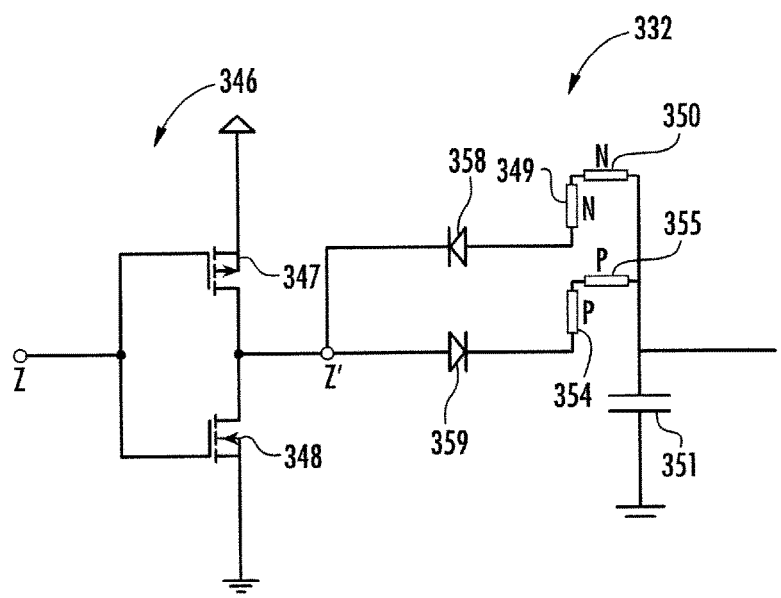
FIG. 7 is a schematic diagram of another embodiment of an inverter stage, according to the present disclosure.
Figure 8A:
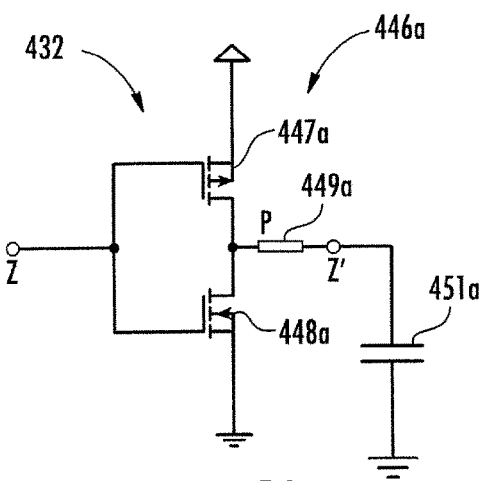
FIGS. 8A-8D are schematic diagrams of another embodiment with four inverter stages, according to the present disclosure.
Figure 8B:
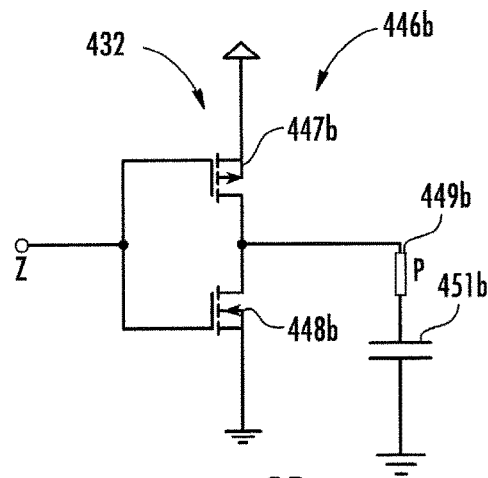
Figure 8C:
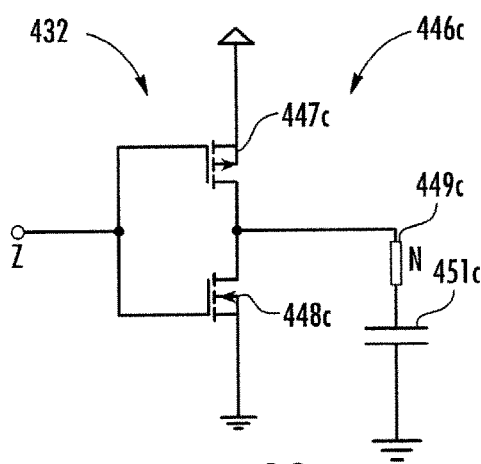
Figure 8D:
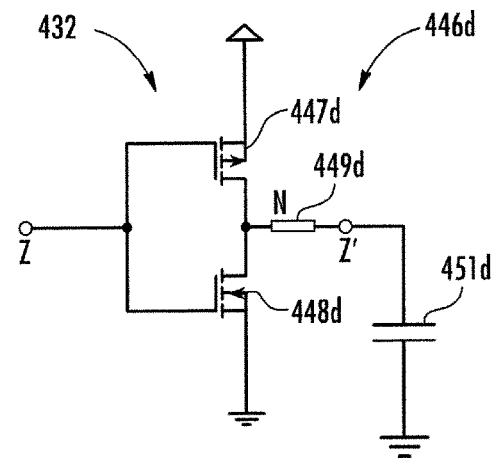

Referring now additionally to FIG. 7, a fourth embodiment of a pressure sensor includes a single ring oscillator 332. In this embodiment of the ring oscillator 332, those elements already discussed above with respect to FIG. 5 are incremented by 300 and most require no further discussion herein. This embodiment differs from the previous embodiment in that this ring oscillator 332 illustratively includes first and second diodes 358-359 for replacing the third and fourth transistors 152-153 (FIG. 5). Here, the information of pressure variation may be obtained from the duty cycle.

Referring now additionally to FIGS. 8A-8D, a fifth embodiment of a pressure sensor includes four independent ring oscillators 432 is now described. In this embodiment of the ring oscillators 432, those elements already discussed above with respect to FIG. 4 are incremented by 400 and most require no further discussion herein. This embodiment differs from the previous embodiment in that the first and second piezoresistors 49a-50b are replaced by a single piezoresistor 449a-449d. The piezoresistors 449a-449b (orthogonal each other) comprise semiconductor material having the first conductivity type, and the piezoresistors 449c-449d (orthogonal each other) comprise semiconductor material having the second conductivity type different from the first.

Figure 9:
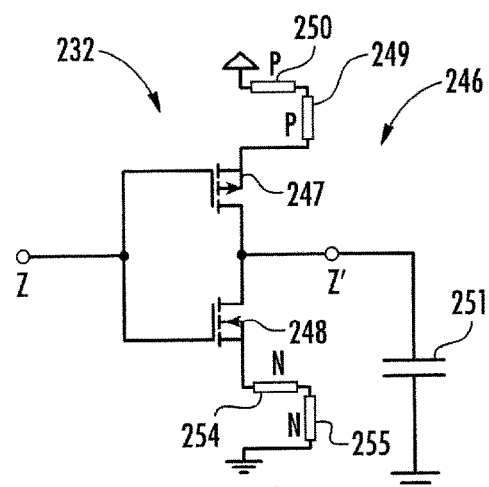
FIG. 9 is a schematic diagram of the inverter stage of FIGS. 6A-6B.
Figure 10:
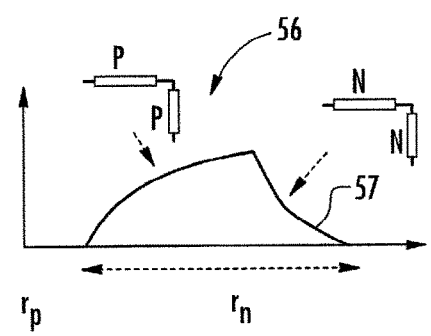
FIG. 10 is a diagram illustrating the RC time constant of the inverter stage of FIGS. 6A-6B.
Figure 11A:
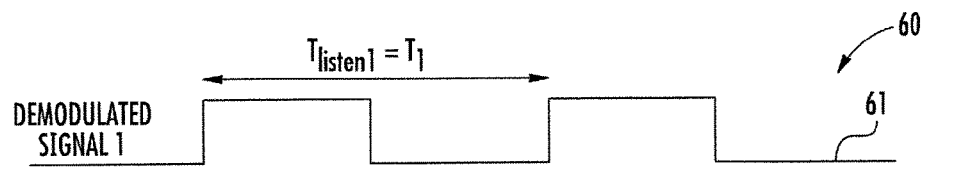
FIGS. 11A-11B are diagrams illustrating operation of the inverter stage of FIG. 5.
Figure 11B:
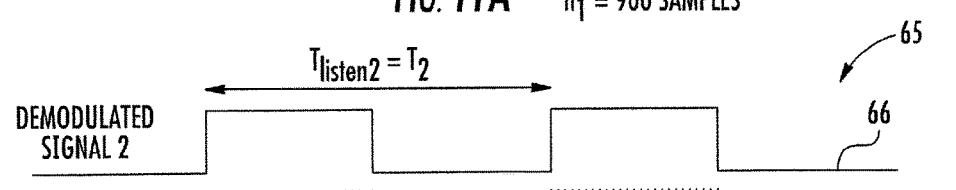
Figure 12A:
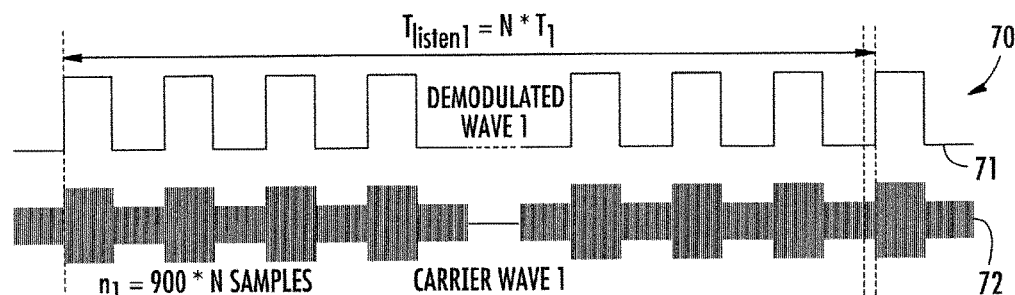
FIGS. 12A-12B are diagrams illustrating operation of the inverter stage of FIG. 5 with a greater number of listening periods than in FIGS. 11A-11B.
Figure 12B:
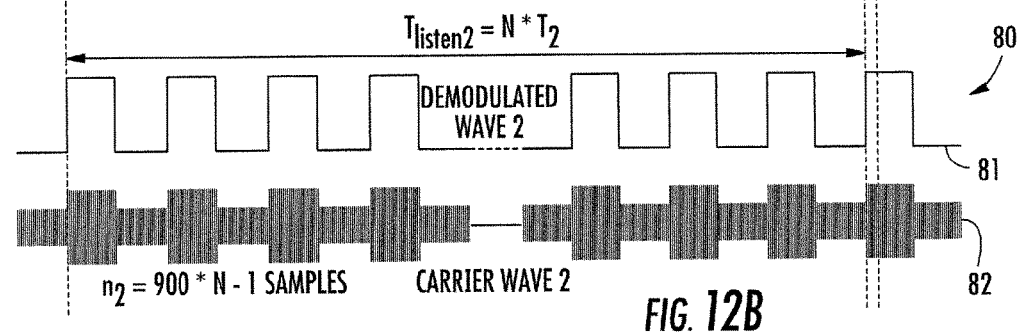
Figure 13:
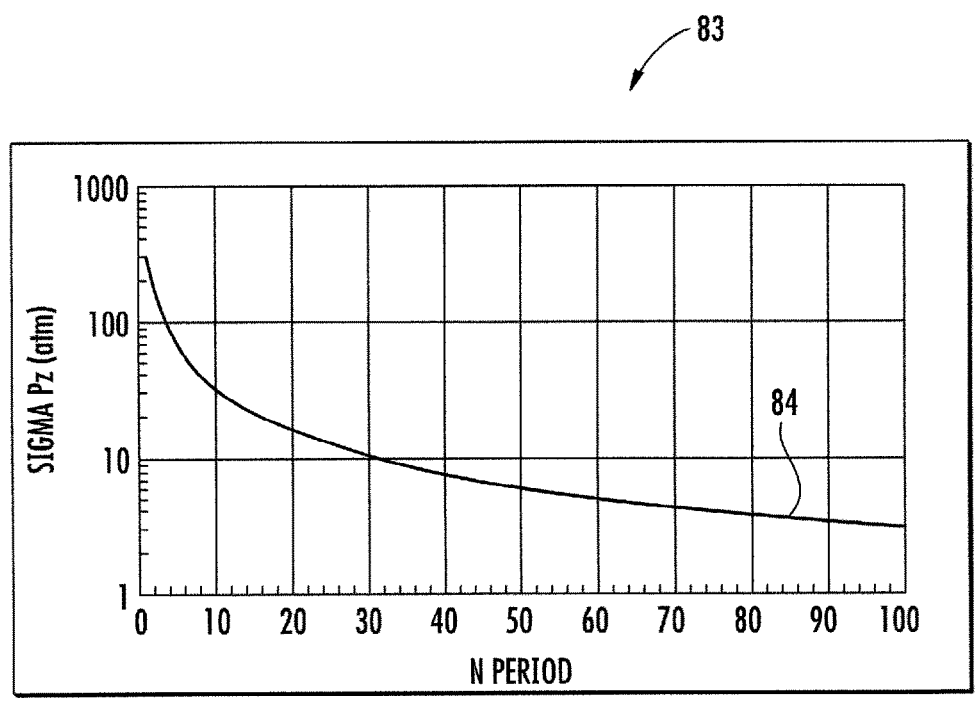
FIG. 13 is a diagram illustrating measured pressure error values related to the number N of measurement listening periods.

Referring now additionally to FIG. 9, a sixth embodiment of a pressure sensor includes a single ring oscillator 432 is now described. This embodiment differs from the previous embodiment in that there is only one ring oscillator with inverter stage 232. The first and second piezoresistors 250 and 244 are coupled to the first transistor 247 having a first conductivity type (e.g. N-type or P-type doped semiconductor). A third and fourth piezoresistors 254-255 are coupled to the second transistor 248 having a second conductivity type different from the first conductivity type (e.g. P-type or N-type doped semiconductor). Here, the information of pressure variation may be obtained from the duty cycle as shown in FIG. 10. In diagram 56, curve 57 shows the RC time constant for the ring oscillator 232.

Referring now to FIGS. 11A-13, some diagrams for the differential pressure sensor device 30 are now reported as example. Diagrams 60, 65, 70, 80 show the output signal 62,

67, 72, 82 of the output interface 31, in an embodiment where ASK modulation is used. The signals 61, 66, 71, 81 before output interface 31 (or after demodulation in the reader 40) are also shown. Diagram 83 includes curve 84, which shows the error of measured normal component of pressure in function of number of listening periods.

In diagram 60, with one period of listen time, $$T_{listen1} = n_1 \cdot T_{carrier} = 1 \ \mu s$$

with $$f_1 = 1 \ \text{MHz; and}$$

$$f_{carrier} = 900 \ \text{MHz} \rightarrow T_{carrier} = \frac{1}{900} \cdot 1 \ \mu s.$$

In diagram 65, $$T_{listen2} = n_2 \cdot T_{carrier} = \frac{899}{900} \cdot 1 \ \mu s$$

$$f_2 = \frac{1}{T_{listen2}} = \frac{900}{899} \cdot 1 \ \text{MHz; and}$$

$$\frac{\Delta f}{f_1} = \frac{f_2 - f_1}{f_1} = \frac{1}{899}.$$

In diagram 70, with N periods of listen time, $$T_{listen1} = n_1 \cdot T_{carrier} = N \cdot 1 \ \mu s$$

$$f_1 = \frac{N}{T_{listen1}} = 1 \ \text{MHz; and}$$

$$f_{carrier} = 900 \ \text{MHz} \rightarrow T_{carrier} = \frac{1}{900} \cdot 1 \ \mu s.$$

In diagram 80, $$T_{listen2} = n_2 \cdot T_{carrier} = \frac{900N - 1}{900} \cdot 1 \ \mu s$$

$$f_2 = \frac{N}{T_{listen2}} = \frac{900N}{900N - 1} \cdot 1 \ \text{MHz; and}$$

$$\frac{\Delta f}{f_1} = \frac{f_2 - f_1}{f_1} = \frac{1}{900N - 1}.$$

Diagram 83 demonstrates the resolution of the pressure sensor by varying the output signal listening time (e.g. the number of listening periods) fixed by the reader device (the temperature is assumed to be constant). This diagram 83 shows the minimum number of listening periods needed to achieve a good measurement in terms of resolution or in terms of maximum error acceptable. One period is not enough but the number of periods should be the right compromise between resolution specification and number of data/seconds to be acquired. In the following example, the length of each $\Delta R/R$ measurement is about 64 $\mu s$ to achieve a maximum error of 5 atm.

$$P_z(t_2) - P_z(t_1) = \frac{10^5}{4.36}\left[\left.\frac{\Delta\tau_n}{\tau_n}\right|_{t_2} - \left.\frac{\Delta\tau_n}{\tau_n}\right|_{t_1} + 8.87\left(\left.\frac{\Delta\tau_p}{\tau_p}\right|_{t_2} - \left.\frac{\Delta\tau_p}{\tau_p}\right|_{t_1}\right)\right] \pm \varepsilon_{P_z}$$

@ $T = 25°$ C.

$$\varepsilon_{P_z} = \frac{10^5}{4.36}\sqrt{2 \cdot \left(\frac{1}{900 \cdot N - 1}\right)^2 + 2 \cdot \left(8.87 \frac{1}{900 \cdot N - 1}\right)^2}$$

$$N = 64 \rightarrow \varepsilon_{P_z} = 5 \ \text{atm}$$

Figure 14:
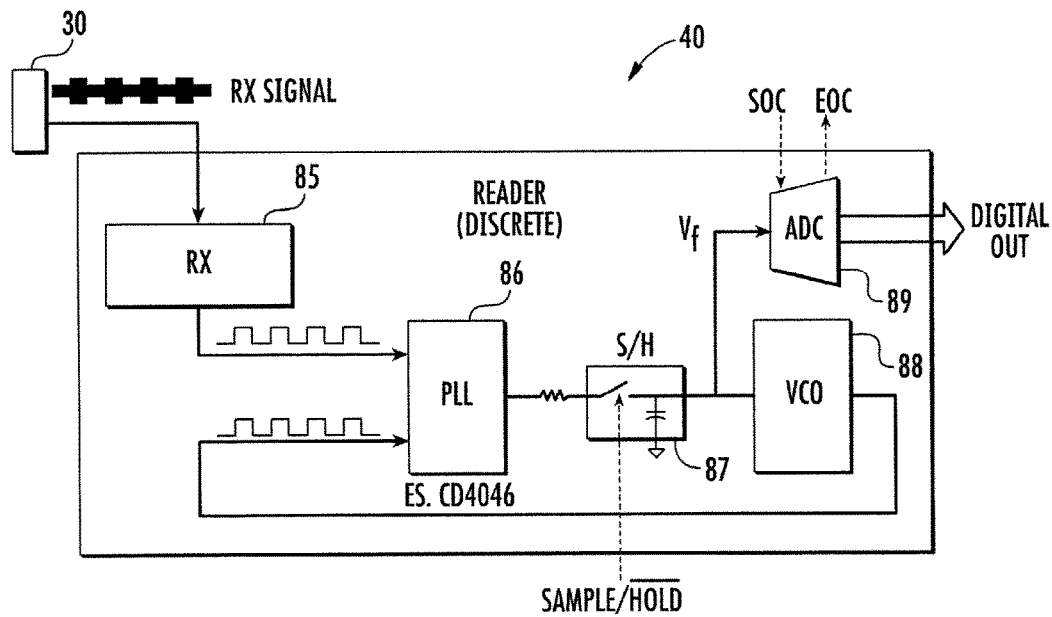
FIG. 14 is a schematic diagram of another embodiment of the reader device, according to the present disclosure.

Referring now to FIGS. 14-15, a portion of a possible implementation of the reader device 40, by using discrete components, illustratively includes a Rx 85, a phased lock loop (PLL) 86 coupled to the Rx 85, a sample-and-hold (S/H) block 87 coupled to the PLL, an analog-to-digital converter 89 coupled to the S/H block, and a voltage controlled oscillator (VCO) 88 also coupled to the S/H block. Diagram 90 is a timing diagram for signals in the portion of reader device 40. Curve 92a shows the ramp signal; curve 92b shows the sense signal; curve 92c shows the output frequency signal; curve 92d shows the sample signal; curve 92e shows the $V_f$ signal; curve 92f shows the SOC (Start Of Conversion) signal; and curve 92g shows the EOC (End Of Conversion) signal. The digital output of the ADC is an estimation of variation of the applied normal pressure.

Figure 16:
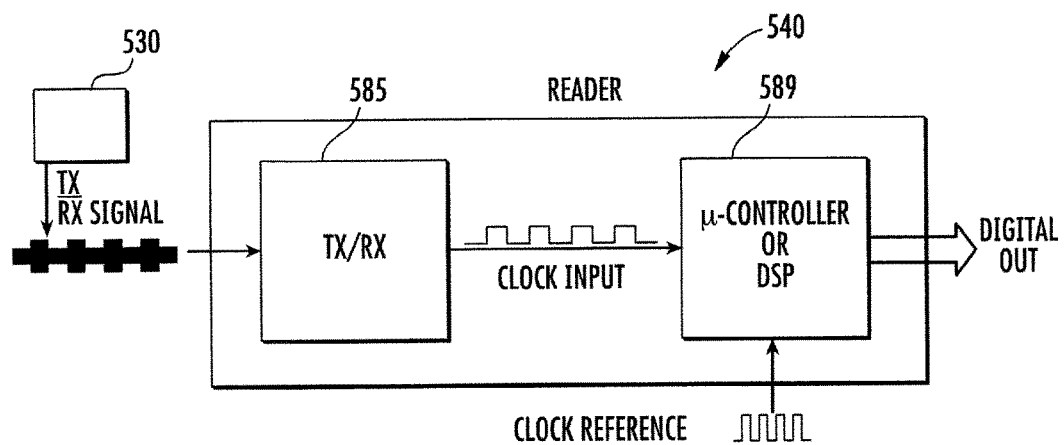
FIG. 16 is a schematic diagram of another embodiment of the reader device, according to the present disclosure.
Figure 17:
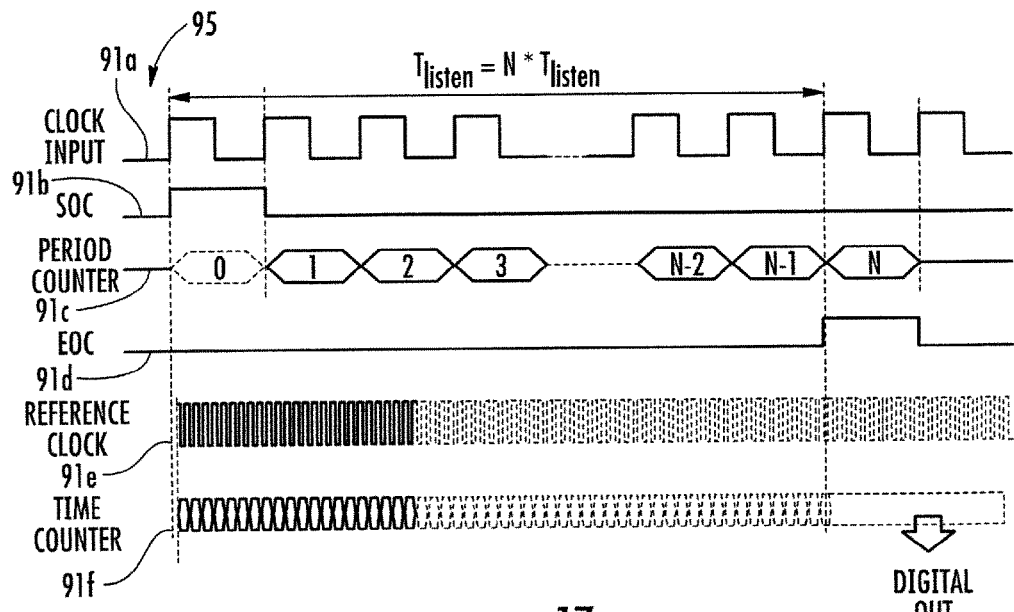
FIG. 17 is a diagram illustrating operation of the reader device of FIG. 16.

Referring now to FIGS. 16-17, a possible implementation of a portion of an integrated reader device 540 illustratively includes a Tx/Rx 585 and a digital elaboration unit (e.g. a microcontroller or a Digital Signal Processor unit) 589 coupled to the Tx/Rx. This approach may be totally integrated by including the Tx/Rx unit and the DSP inside the same IC. Diagram 95 is a timing diagram for signals in the portion of reader device 543. Curve 91a shows the clock signal; curve 91b shows the SOC signal; curve 91c shows the period counter signal; curve 91d shows the SOC signal; curve 91e shows the reference clock signal; and curve 91f shows the time counter signal. The final value of the time counter is the digital estimation of the variation of applied pressure. This value may be used, through calibration algorithms, to obtain the pressure.

A pressure sensor device to be positioned within material, the pressure sensor device comprising: an integrated circuit (IC) comprising a ring oscillator comprising a plurality of inverter stages coupled together, at least one of said plurality of inverter stages comprising first and second piezoresistors coupled together, arranged orthogonal to one another, and having first and second resistance values responsive to pressure, and an output interface coupled to said ring oscillator and configured to generate a pressure output signal based upon the first and second resistances and indicative of pressure normal to said IC. The pressure sensor device of claim 1 wherein said at least one inverter stage comprises first and second inverter stages, said first inverter stage having first and second piezoresistors comprising a semiconductor material having a first conductivity type, and said second inverter stage having first and second piezoresistors comprising a semiconductor material having a second conductivity type. The pressure sensor device of claim 1 wherein said first and second piezoresistors comprise a semiconductor material having a first conductivity type; and wherein said at least one inverter stage also comprises third and fourth piezoresistors coupled together and comprising a semiconductor material having a second conductivity type. The pressure sensor device of claim 3 wherein said third and fourth piezoresistors are arranged orthogonal to one another, and have third and fourth resistance values responsive to pressure. The pressure sensor device of claim 1 wherein said output interface comprises a wireless transmitter. The pressure sensor device of claim 5 wherein said output interface comprises a modulator coupled upstream of said wireless transmitter and configured generate the pressure output signal by modulating an output of said ring oscillator circuit.

The pressure sensor device of claim 6 wherein said modulator is configured to operate based upon an amplitude-shift keying modulation. The pressure sensor device of claim 1 wherein said at least one inverter stage comprises a capacitor coupled to said first and second piezoresistors. A method of making a pressure sensor device to be positioned within material, the method comprising: forming an integrated circuit (IC) comprising a ring oscillator comprising a plurality of inverter stages coupled together, at least one of the plurality of inverter stages comprising first and second piezoresistors coupled together, arranged orthogonal to one another, and having first and second resistance values responsive to pressure, and an output interface coupled to the ring oscillator and configured to generate a pressure output signal based upon the first and second resistances and indicative of pressure normal to the IC.

The method of claim 9 wherein the at least one inverter stage comprises first and second inverter stages, the first inverter stage having first and second piezoresistors comprising a semiconductor material having a first conductivity type, and the second inverter stage having first and second piezoresistors comprising a semiconductor material having a second conductivity type. The method of claim 9 wherein the first and second piezoresistors comprise a semiconductor material having a first conductivity type; and wherein the at least one inverter stage also comprises third and fourth piezoresistors coupled together and comprising a semiconductor material having a second conductivity type. The method of claim 11 wherein the third and fourth piezoresistors are arranged orthogonal to one another, and have third and fourth resistance values responsive to pressure.

The method of claim 9 wherein the output interface comprises a wireless transmitter. The method of claim 13 wherein the output interface comprises a modulator coupled upstream of the wireless transmitter and configured generate the pressure output signal by modulating an output of the ring oscillator circuit.

A pressure sensor device to be positioned within material, the pressure sensor device comprising: an integrated circuit (IC) comprising a ring oscillator comprising a plurality of inverter stages coupled together, at least one of said plurality of inverter stages comprising a first piezoresistor, at least one other inverter stage of said plurality of inverter stages comprising a second piezoresistor arranged orthogonal to said first piezoresistor, said first and second piezoresistors having first and second resistance values responsive to pressure, and an output interface coupled to said ring oscillator and configured to generate a pressure output signal based upon the first and second resistances and indicative of pressure normal to said IC.

The pressure sensor device of claim 15 wherein said first and second piezoresistors comprise a semiconductor material having a first conductivity type. The pressure sensor device of claim 15 wherein said output interface comprises a wireless transmitter. The pressure sensor device of claim 17 wherein said output interface comprises a modulator coupled upstream of said wireless transmitter and configured generate the pressure output signal by modulating an output of said ring oscillator circuit. The pressure sensor device of claim 18 wherein said modulator is configured to operate based upon an amplitude-shift keying modulation.

A method of making a pressure sensor device to be positioned within material, the method comprising: forming an integrated circuit (IC) comprising a ring oscillator comprising a plurality of inverter stages coupled together, at least one of the plurality of inverter stages comprising a first piezoresistor, at least one other inverter stage of the plurality of inverter stages comprising a second piezoresistor arranged orthogonal to the first piezoresistor, the first and second piezoresistors having first and second resistance values responsive to pressure, and an output interface coupled to the ring oscillator and configured to generate a pressure output signal based upon the first and second resistances and indicative of pressure normal to the IC.

The method of claim 20 wherein the first and second piezoresistors comprise a semiconductor material having a first conductivity type. The method of claim 20 wherein the output interface comprises a wireless transmitter. The method of claim 22 wherein the output interface comprises a modulator coupled upstream of the wireless transmitter and configured generate the pressure output signal by modulating an output of the ring oscillator circuit. The method of claim 23 wherein the modulator is configured to operate based upon an amplitude-shift keying modulation.

A pressure sensor device to be positioned within a material where a mechanical parameter is measured, the pressure sensor device comprising: an integrated circuit (IC) comprising a first ring oscillator comprising an inverter stage comprising a first doping piezoresistor couple, comprising two piezoresistors arranged orthogonal to one another with a same first resistance value responsive to pressure, a second ring oscillator comprising an inverter stage comprising a second doping piezoresistor couple, comprising two piezoresistors arranged orthogonal to one another with a same second resistance value responsive to pressure, and an output interface coupled to said first and second ring oscillators and configured to generate a pressure output signal based upon the first and second resistance values and indicative of pressure normal to said IC.

A pressure sensor device to be positioned within a material where a mechanical parameter is measured, the pressure sensor device comprising: an integrated circuit (IC) comprising a first ring oscillator comprising an inverter stage comprising a first doping piezoresistor with a first resistance value responsive to pressure, a second ring oscillator comprising an inverter stage comprising a first doping piezoresistor with a second resistance value responsive to pressure, a third ring oscillator comprising an inverter stage comprising a second doping piezoresistor with a third resistance value responsive to pressure, a fourth ring oscillator comprising an inverter stage comprising a second doping piezoresistor with a fourth resistance value responsive to pressure, said first doping piezoresistors arranged orthogonal to one another, and said second doping piezoresistors arranged orthogonal to one another, and an output interface coupled to said first, second, third and fourth ring oscillators and configured to generate a pressure output signal based upon the first, second, third and fourth resistance values and indicative of pressure normal to said IC.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A pressure sensor device to be positioned within a material where a mechanical parameter is measured, the pressure sensor device comprising:
   an integrated circuit (IC) comprising
      a ring oscillator comprising at least one inverter stage comprising first doped and second doped piezoresistor couples,
      each piezoresistor couple comprising two piezoresistors arranged orthogonal to one another with a same resistance value,
      each piezoresistor couple having first and second resistance values responsive to pressure, and
      an output interface coupled to said ring oscillator and configured to generate a pressure output signal based upon the first and second resistance values and indicative of pressure normal to said IC.

2. The pressure sensor device of claim 1 wherein said first doped piezoresistor couple comprises a semiconductor material having a first conductivity type; and wherein said second doped piezoresistor couple comprises semiconductor material having a second conductivity type.

3. The pressure sensor device of claim 1 wherein said output interface comprises a wireless transmitter.

4. The pressure sensor device of claim 3 wherein the output interface comprises a modulator coupled upstream of said wireless transmitter and configured to generate the pressure output signal by modulating an output of said ring oscillator circuit.

5. The pressure sensor device of claim 4 wherein said modulator is configured to operate based upon an amplitude-shift keying modulation.

6. The pressure sensor device of claim 1 wherein said at least one inverter stage comprises a capacitor coupled to said first and second doped piezoresistor couples.

7. A method of determining a pressure, the method comprising:
   experiencing a pressure at a pressure sensor, the pressure experienced in first, second and third directions that are orthogonal to one another;
   using a first n-doped piezoresistor and a first p-doped piezoresistor to cancel out a pressure effect in the first direction, the first n-doped piezoresistor and the first p-doped piezoresistor being arranged in a first common orientation;
   using a second n-doped piezoresistor and a second p-doped piezoresistor to cancel out a pressure effect in the second direction, the second n-doped piezoresistor and the second p-doped piezoresistor being arranged in a second common orientation that is orthogonal with the first common orientation; and
   determining a pressure measurement indicative of a pressure experienced in the third direction, the third direction being normal to a horizontal plane of the pressure sensor.

8. The method of claim 7, wherein determining the pressure measurement comprises using ring oscillator circuitry that comprises a first inverter coupled to the first n-doped piezoresistor and the second n-doped piezoresistor and a second inverter coupled to the first p-doped piezoresistor and the second p-doped piezoresistor, wherein the first and second inverters are different inverters or the same inverter.

9. The method of claim 8, wherein the ring oscillator circuitry comprises a first ring oscillator that comprises the first inverter and a second ring oscillator that comprises the second inverter.

10. The method of claim 7, wherein the pressure sensor is embedded in a solid material, the method further comprising wirelessly transmitting a pressure output signal that provides an indication of the pressure measurement.

11. The method of claim 10, further comprising calibrating the pressure sensor with a known amount of pressure normal to the horizontal plane of the pressure sensor to determine a piezoresistivity of each of the first n-doped piezoresistor, the second n-doped piezoresistor, the first p-doped piezoresistor and the second p-doped piezoresistor.

12. A pressure sensor to be positioned within a material to measure pressure in the material, the pressure sensor comprising:
   ring oscillator circuitry comprising:
      a first inverter coupled to a first piezoresistor couple, the first piezoresistor couple including a first n-doped piezoresistor and a second n-doped piezoresistor that are arranged orthogonal to one another across a surface of the pressure sensor, the first n-doped piezoresistor and a second n-doped piezoresistor having the same resistance value; and
      a second inverter coupled to a second piezoresistor couple, the second piezoresistor couple including a first p-doped piezoresistor and a second p-doped piezoresistor that are arranged orthogonal to one another across the surface of the pressure sensor, the first p-doped piezoresistor and a second p-doped piezoresistor having the same resistance value;
      wherein the first and second inverters are different inverters or the same inverter and wherein each piezoresistor couple has a resistance value responsive to pressure; and
   an output interface coupled to the ring oscillator circuitry configured to generate a pressure output signal based upon the resistance values in the ring oscillator circuitry, and indicative of pressure normal to the pressure sensor.

13. The pressure sensor of claim 12, wherein the first inverter and the second inverter are different inverters, the first and second n-doped piezoresistors being coupled to an output of the first inverter and the first and second p-doped piezoresistors being coupled to the output of the second inverter.

14. The pressure sensor of claim 12, wherein the first inverter and the second inverter are a single inverter, the first and second n-doped piezoresistors and the first and second p-doped piezoresistors being coupled to the output of the single inverter.

15. The pressure sensor of claim 14, further comprising:
   a first transistor coupled between the output of the single inverter and the first and second n-doped piezoresistors; and
   a second transistor coupled between the output of the single resistor and the first and second p-doped piezoresistors.

16. The pressure sensor of claim 14, further comprising:
   a first diode coupled between the output of the single inverter and the first and second n-doped piezoresistors; and
   a second diode coupled between the output of the single resistor and the first and second p-doped piezoresistors.

17. The pressure sensor of claim 12, wherein the first and second inverters are two separate inverters;
   wherein the first inverter comprises a first p-channel transistor coupled in series with a first n-channel transistor between a reference voltage node and a ground node, the first and second n-doped piezoresistors coupled between the first p-channel transistor and the reference voltage node;

wherein the pressure sensor further comprises third and fourth n-doped piezoresistors coupled between the first n-channel transistor and the ground node, the third n-doped piezoresistor being arranged in the same direction as the first n-doped piezoresistor and the fourth n-doped piezoresistor being arranged in the same direction as the second n-doped piezoresistor;

wherein the second inverter comprises a second p-channel transistor coupled in series with a second n-channel transistor between the reference voltage node and the ground node, the first and second p-doped piezoresistors coupled between the second p-channel transistor and the reference voltage node; and wherein the pressure sensor further comprises third and fourth p-doped piezoresistors coupled between the second n-channel transistor and the ground node, the third p-doped piezoresistor being arranged in the same direction as the first p-doped piezoresistor and the fourth p-doped piezoresistor being arranged in the same direction as the second p-doped piezoresistor.

18. The pressure sensor of claim 12, wherein the first and second inverters are a single inverter that comprises a p-channel transistor coupled in series with a n-channel transistor between a reference voltage node and a ground node, the first and second n-doped piezoresistors coupled between the p-channel transistor and the ground node and the first and second p-doped piezoresistors coupled between the p-channel transistor and the reference voltage node.

19. A pressure sensor to be positioned within a material to measure pressure in the material, the pressure sensor comprising:
ring oscillator circuitry comprising:
a first ring oscillator including a first inverter coupled to a first n-doped piezoresistor having a resistance value responsive to pressure;
a second ring oscillator including a second inverter coupled to a second n-doped piezoresistor having a resistance value responsive to pressure;
a third ring oscillator including a third inverter coupled to a first p-doped piezoresistor having a resistance value responsive to pressure; and
a fourth ring oscillator including a fourth inverter coupled to a second p-doped piezoresistor having a resistance value responsive to pressure; and
an output interface coupled to the ring oscillator circuitry configured to generate a pressure output signal based upon the resistance values in the ring oscillator circuitry, and indicative of pressure normal to the pressure sensor,
wherein the first ring oscillator and the second ring oscillator are positioned in the pressure sensor relative to one another such that the first n-doped piezoresistor is orthogonal to the second n-doped piezoresistor, and
wherein the fourth ring oscillator and the third ring oscillator are positioned in the pressure sensor relative to one another such that the first p-doped piezoresistor is orthogonal to the second p-doped piezoresistor.

20. A pressure sensor device to be positioned within a material for measuring a mechanical pressure within the material, the pressure sensor device comprising:
a substrate; and
an integrated circuit (IC) on the substrate in a horizontal plane, the IC comprising:
ring oscillator circuitry configured to oscillate at a frequency that varies in response to a variation of pressure on the IC, the mechanical pressure including a pressure across the horizontal plane of the IC and a pressure normal to the horizontal plane of the IC; and
an output interface coupled to the ring oscillator circuitry and configured to generate a pressure output signal based upon a measured variation of an oscillating frequency indicative of an amount of the pressure normal to the horizontal plane of the IC;
wherein the ring oscillator circuitry comprises an inverter and two piezoresistor couples electrically coupled together in an arranged configuration, the two piezoresistor couples including a first piezoresistor couple and a second piezoresistor couple, each piezoresistor couple comprising two piezoresistors with matching conductivity type, piezoresistivity and resistance values;
wherein the two piezoresistors in each piezoresistor couple are positioned orthogonally to one another across the horizontal plane of the IC and the substrate;
wherein the first piezoresistor couple has a p-doped conductivity type and the second piezoresistor couple has an n-doped conductivity type;
wherein the ring oscillator circuitry is configured to experience variations in oscillating frequency from variations in resistance values of each piezoresistor in response to the pressure on the IC, according to the piezoresistivity of the piezoresistor; and
wherein the arranged configuration removes effects attributable to the pressure across the horizontal plane of the IC, so that the amount of the pressure normal to the horizontal plane of the IC can be determined based upon the measured variation of the oscillating frequency of the ring oscillator circuitry.

21. The pressure sensor device of claim 20, wherein the output interface comprises a wireless transmitter.

22. The pressure sensor device of claim 21, wherein the output interface comprises a modulator coupled upstream of the wireless transmitter and configured to generate the pressure output signal with amplitude-shift keying modulation of an output of the ring oscillator circuitry.

23. The pressure sensor device of claim 20, wherein the inverter comprises two transistors electrically coupled in series to each other, the two transistors being electrically coupled to a capacitor and the first piezoresistor couple and the second piezoresistor couple.

24. The pressure sensor device of claim 20, wherein the material is concrete.

25. The pressure sensor device of claim 20, wherein the piezoresistivity and resistance values are predetermined by having been calibrated with a known amount of pressure normal to the horizontal plane to the IC.

26. The pressure sensor device of claim 20, wherein the first piezoresistor couple is positioned close to the second piezoresistor couple so that both piezoresistor couples are subject to a similar pressure.

27. The pressure sensor device of claim 20, wherein the ring oscillator circuitry comprises two independent ring oscillators, including a first ring oscillator and a second ring oscillator, each ring oscillator having an oscillating frequency varying in response to a variation of pressure on the IC;
wherein the first ring oscillator comprises a first inverter and the first piezoresistor couple;

wherein the second ring oscillator comprises a second inverter and the second piezoresistor couple; and wherein each ring oscillator experiences variations in oscillating frequency from variations in resistance values of its piezoresistors in response to the pressure on the IC according to the piezoresistivity of the piezoresistor.

28. The pressure sensor device of claim 27, wherein the first ring oscillator further comprises a third piezoresistor couple electrically coupled to the first inverter and the first piezoresistor couple, and the second ring oscillator further comprises a fourth piezoresistor couple coupled to the second inverter and the second piezoresistor couple;

wherein the third piezoresistor couple comprises two piezoresistors with matching p-doped conductivity type, piezoresistivity and resistance values, and with the piezoresistors being positioned orthogonally to one another across the horizontal plane of the IC and the substrate; and wherein the fourth piezoresistor couple comprises two piezoresistors with matching n-doped conductivity type, piezoresistor and resistance values, and with the piezoresistors being positioned orthogonally to one another across the horizontal plane of the IC and the substrate.

29. The pressure sensor device of claim 20, wherein the ring oscillator circuitry comprises four independent ring oscillators, including a first ring oscillator, a second ring oscillator, a third ring oscillator and a fourth ring oscillator, each ring oscillator having an oscillating frequency varying in response to a variation of pressure on the IC, the pressure across the horizontal plane of the IC including a pressure across an x-y plane, and the pressure normal to the horizontal plane of the IC including a z-direction pressure along a z-axis normal to the x-y plane, the x-y plane being defined with an x-axis and a y-axis;

wherein the inverter comprises a first inverter, a second inverter, a third inverter and a fourth inverter;

wherein the first ring oscillator comprises the first inverter electrically coupled to a first piezoresistor from the first piezoresistor couple in a first arranged configuration;

wherein the second ring oscillator comprises the second inverter electrically coupled to a second piezoresistor from the first piezoresistor couple in a second arranged configuration;

wherein the third ring oscillator comprises the third inverter electrically coupled to a first piezoresistor from the second piezoresistor couple in a third arranged configuration;

wherein the fourth ring oscillator comprises the fourth inverter electrically coupled to a second piezoresistor in a fourth arranged configuration;

wherein the first piezoresistor couple is defined across the first ring oscillator and the second ring oscillator on the x-y plane, and the second piezoresistor couple is defined across the third ring oscillator and the fourth ring oscillator on the x-y plane;

wherein the first arranged configuration and the second arranged configuration include the first piezoresistor couple having the p-doped conductivity type, and the first ring oscillator and the second ring oscillator being positioned relative to one another such that the first piezoresistor in the first ring oscillator is positioned parallel to the x-axis and orthogonally to the second piezoresistor in the second ring oscillator, the second piezoresistor in the second ring oscillator being positioned parallel to the y-axis;

wherein the third arranged configuration and the fourth arranged configuration include the second piezoresistor couple having the n-doped conductivity type, and the third ring oscillator and the fourth ring oscillator being positioned relative to one another such that the first piezoresistor in the third ring oscillator is positioned parallel to the x-axis and orthogonally to the second piezoresistor in the fourth ring oscillator, the second piezoresistor in the fourth ring oscillator being positioned parallel to the y-axis;

wherein each ring oscillator experiences variations in oscillating frequency from variations in a resistance value of the piezoresistor in the ring oscillator in response to the pressure on the IC, according to the piezoresistivity of the piezoresistor; and wherein the first arranged configuration, the second arranged configuration, the third arranged configuration and the fourth arranged configuration together cancel pressure contributions in the x-y plane, so that an amount of z-direction pressure can be determined from the measured variations of the oscillating frequencies.

* * * * *

UNITED STATES PATENT AND TRADEMARK OFFICE
CERTIFICATE OF CORRECTION

PATENT NO. : 9,719,874 B2
APPLICATION NO. : 14/754788
DATED : August 1, 2017
INVENTOR(S) : Alessandro Motta et al.

It is certified that error appears in the above-identified patent and that said Letters Patent is hereby corrected as shown below:

In the Specification

In Column 8, Line 56, delete "244" and insert --249--.

In the Claims

In Column 15, Line 30, Claim 18, delete "p-channel transistor" and insert --n-channel transistor--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*